United States Patent [19]

Shu

[11] Patent Number: 4,617,996

[45] Date of Patent: Oct. 21, 1986

[54] IMMISCIBLE OIL RECOVERY PROCESS

[75] Inventor: Winston R. Shu, Dallas, Tex.

[73] Assignee: Mobil Oil Corporation, New York, N.Y.

[21] Appl. No.: 726,195

[22] Filed: Apr. 22, 1985

Related U.S. Application Data

[63] Continuation-in-part of Ser. No. 704,232, Feb. 22, 1985.

[51] Int. Cl.⁴ .............................................. E21B 43/22
[52] U.S. Cl. ............................................... 166/273
[58] Field of Search ......................... 166/273, 274, 275

[56] References Cited

U.S. PATENT DOCUMENTS

| | | | |
|---|---|---|---|
| 2,623,596 | 12/1952 | Whorton et al. | 166/274 |
| 2,875,832 | 3/1959 | Martin et al. | 166/9 |
| 3,249,157 | 5/1966 | Brigham et al. | 166/273 |
| 3,270,809 | 9/1966 | Connally, Jr. et al. | 166/273 |
| 3,620,304 | 11/1971 | Hearn et al. | 166/274 |
| 3,623,552 | 11/1971 | Vairogs | 166/274 |
| 3,661,208 | 5/1972 | Scott et al. | 166/274 |
| 3,687,198 | 8/1972 | Hearn et al. | 166/274 |
| 4,136,738 | 1/1979 | Haynes, Jr. et al. | 166/273 |
| 4,372,381 | 2/1983 | McMillen | 166/274 |

*Primary Examiner*—Stephen J. Novosad
*Assistant Examiner*—William P. Neuder
*Attorney, Agent, or Firm*—Alexander J. McKillop; Michael G. Gilman; Charles A. Malone

[57] ABSTRACT

A flooding process for oil recovery which is carried out under conditions of immiscibility or near-immiscibility, employs a displacing fluid such as carbon dioxide and an additive such as ethane which increases the solubility of the displacing fluid in the reservoir oil. The additive is injected in a slug with the displacing fluid preferably followed by a slug of water to improve sweep, after which displacing fluid alone may be injected to extract residual additive and oil. A number of slugs of displacing fluid, either by itself or with the additive may be injected, with intervening slugs of water and finally, water injection may be made to termination.

33 Claims, 4 Drawing Figures

IMMISCIBLE OIL RECOVERY PROCESS

CROSS REFERENCE TO RELATED APPLICATIONS

This application is a continuation-in-part of my earlier application Ser. No. 704,232, filed Feb. 22, 1985, entitled Miscible Oil Recovery Process. My earlier application is directed to a flooding process for oil recovery employing a multiple contact miscible solvent such as carbon dioxide with an additive such as butane which lowers the minimum miscibility pressure of the solvent/oil system. The amount of the solubility-improving additive is decreased as the flooding operation proceeds so that the additive is progressively removed from the reservoir as subsequent amounts of solvent enter the reservoir.

The present recovery process operates in a similar manner but under immiscible or near immiscible conditions, as described below.

The disclosure of my earlier application Ser. No. 704,232 is incorporated in the present application by reference.

FIELD OF THE INVENTION

This invention relates to the revovery of oil from subterranean, oil-bearing reservoirs using a displacement fluid such as carbon dioxide, under immiscible displacement conditions.

BACKGROUND OF THE INVENTION

In the recovery of oil from subterranean, oil-bearing formations or reservoirs, it is usually possible to recover only a limited proportion of the original oil present in the reservoir by the so-called primary recovery methods which utilize the natural formation pressure to produce the oil through suitable production wells. For this reason, a variety of supplementary recovery techniques have been employed, directed either to maintaining formation pressure or to improving the displacement of the oil from the porous rock matrix. Techniques of this kind have included formation pressurization, thermal recovery methods such as steam flooding and in situ combustion, water flooding and miscible and immiscible flooding techniques.

In miscible flooding operations, a solvent is injected into the reservoir to form a single phase solution with the oil in place so that the oil can then be removed as a more highly mobile phase from the reservoir. This provides extremely effective displacement of the oil in the areas through which the solvent flows, so that an extremely low residual saturation is obtained. The efficiency of this process derives from the fact that under the conditions of temperature and pressure prevailing in the reservoir, a two-phase system within the reservoir between the solvent and the reservoir oil is eliminated. When this happens the retentive forces of capillarity and interfacial tension which are significant factors in reducing the recovery efficiency of oil in conventional flooding operations where the displacing agent and the reservoir oil exist as two separate phases, are eliminated or substantially reduced.

Miscible recovery operations are normally carried out by a displacement procedure in which the solvent is injected into the reservoir through an injection well to displace the oil from the reservoir towards a production well from which the oil is produced. Because the solvent, typically a light hydrocarbon such as liquid petroleum gas (LPG) or a paraffin in the $C_2$ to $C_6$ range, may be quite expensive, it is often desirable to carry out the recovery by injecting a slug of the solvent, followed by a cheaper displacement liquid such as water. However, the economics of miscible recovery operations using first contact miscible solvents such as LPG or light hydrocarbons are quite unattractive.

Of the various recovery processes so far used or proposed, flooding by carbon dioxide is considered to be of substantial promise. In the carbon dioxide flooding technique, a slug of carbon dioxide is injected into the formation to mobilize the oil and permit it to be displaced towards a production well. Even under conditions where the carbon dioxide is not wholly effective as a solvent for the oil, recovery may be improved by taking advantage of the solubility of carbon dioxide in the oil, causing a viscosity reduction and a swelling of the oil, which leads to increased recovery. These effects have been utilized at pressures much lower than the miscibility pressures for carbon dioxide and oil. Processes using carbon dioxide as a recovery agent are described in U.S. Pat. Nos. 3,811,501, 3,811,502, 3,497,007, 4,299,286 and 4,410,043.

Carbon dioxide is not a first contact miscible solvent like LPG or a light hydrocarbon, which forms a single phase solution with the reservoir when the two come into contact, i.e. upon their first contact. Rather, carbon dioxide is capable of forming a single phase under appropriate conditions but only after a period of time during which the carbon dioxide first preferentially extracts the light hydrocarbons containing from two to six carbon atoms from the crude oil, thereby developing a hydrocarbon-containing solution at the interface between the carbon dioxide and the crude oil. This solution is able to dissolve other, heavier hydrocarbons, i.e. $C_{6+}$ hydrocarbons and these progressively enter the solution to form a single phase which is then carried forward through the reservoir, progressively dissolving heavier hydrocarbons as it advances. Thus, as the flooding front advances through the reservoir, the composition of the displaced fluid gradually changes from the crude oil to that of the pure carbon dioxide under these conditions.

Multiple contact miscibility is a function of the pressure of the system and the minimum pressure required to achieve multiple contact miscibility is called the minimum miscibility pressure or MMP. This varies according to the nature of the oil and of the solvent and in accordance with certain other factors. In some reservoirs, the minimum miscibility pressure may be unattainable due to factors such as low overburden pressure or the impracticality of pressurizing the reservoir. Also, the MMP is usually very high for low gravity viscous oils. If the minimum miscibility pressure cannot be achieved in the reservoir, the flooding process will be immiscible in character and recovery from the solvent injection will generally tend to be low.

In application Ser. No. 704,232, I described a method for improving the recovery of reservoir oil under conditions which normally would have been unfavorable for miscible flooding. In the method described in that application, a solubility-improving additive such as butane is injected with the initial slug of solvent to lower the minimum miscibility pressure (MMP) to a value which is no higher than the prevailing reservoir pressure. In this way, miscibility may be attained even in reservoirs at a relatively low pressure. The additive is progressively removed from the reservoir as the flooding operation continues by injecting subsequent slugs of solvent with reduced amounts of the additive although the operation continues to proceed under miscible conditions as the solubility-improving additive which remains in the formation behind the advancing solvent front is picked up by successive solvent slugs containing less than the equilibrium amount of the additive.

Although that process is capable of improving recovery under otherwise unfavorable conditions of low reservoir pressure it does have certain limitations. One, of course, is that if the reservoir pressure is too low it may not be possible to reduce the MMP of the solvent/oil system to that level, except possibly by the use of wholly uneconomic amounts of the solubility additive. Thus, the method described in my earlier application may not be susceptible of universal application, especially in heavy oil reservoirs or in low pressure reservoirs where re-pressurization is either not possible or economically unattractive. This implies that it may, in such cases, be necessary to carry out the flooding under immiscible conditions where the flooding liquid forms a two-phase system with the reservoir oil. As mentioned above, this is generally expected to reduce the efficiency of the recovery to a level below that of a miscible operation. There is a need, therefore, to improve the recovery under these circumstances.

SUMMARY OF THE INVENTION

It has now been found that if ethane or another higher hydrocarbon is added to a carbon dioxide flooding fluid, flooding under immiscible conditions is improved. The hydrocarbon ($C_{2+}$) acts to reduce the viscosity of the oil in the reservoir by materially increasing the extent to which the carbon dioxide dissolves in the oil. As mentioned above, dissolution of carbon dioxide in the reservoir oil promotes swelling of the oil with a concomitant reduction in viscosity, even if miscibility is not achieved. Thus, the use of the hydrocarbon as a solubility promoter will improve recovery even when operating under immiscible flooding conditions.

The recovery process according to the preesent invention is preferably carried out in a similar manner to that described in my earlier application, Ser. No. 704,232. Thus, the flooding fluid which is initially injected into the formation contains a relatively high amount of the hydrocarbon but this is progressively reduced, either continuously or step-wise, as the flooding operation proceeds and more of the displacing fluid is injected. Because the hydrocarbon is soluble in the oil, it will remain in the reservoir together with residual oil which is not displaced by the initial portions of the displacing fluid and it will then act to improve the viscosity of the residual oil as further portions of displacing fluid are injected with a lower proportion of the hydrocarbon. The final portions of the displacing fluid may be injected without any additional hydrocarbon.

The mixture of displacing fluid and hydrocarbon is preferentially injected in slugs with intervening water slugs to improve the sweep of the process. Finally, the bank of displacing fluid may be driven through the reservoir by continuous water injection until the process can no longer be economically operated.

The process is particularly suitable with carbon dioxide as the displacing fluid but it may also be used with other non-aqueous displacement fluids which will displace the oil by immiscible or near immiscible displacement such as methane or carbon monoxide, although the latter is not likely to be practically attractive. With carbon dioxide as the displacing fluid, the preferred solubility promoters for the carbon dioxide are ethane and other light hydrocarbons such as LPG and other $C_2$ to $C_6$ paraffins.

THE DRAWINGS

DETAILED DESCRIPTION

Figure 1:
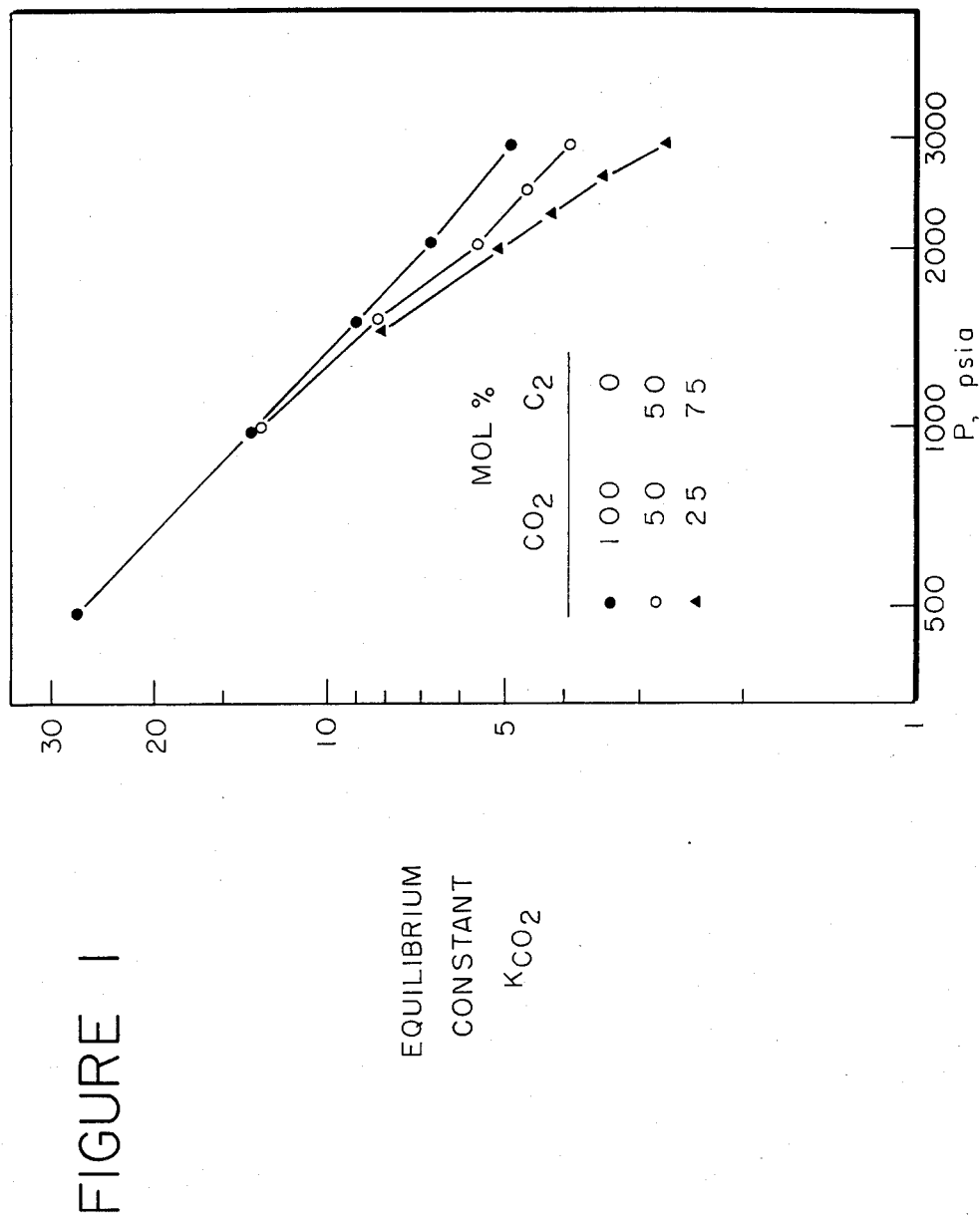
FIG. 1 is a graph relating the solubility of carbon dioxide in oil to pressure at varying concentrations of ethane in the carbon dioxide.

The oil is recovered from the subterranean, oil-bearing formation or reservoir by injecting a displacing fluid into the reservoir through an injection well and recovering fluids from a production well which is at a horizontal distance or offset from the injection well. In practice, more than one injection well and more than one production well may be used and these may be arranged in a number of different patterns suitable for solvent drive operations of this kind. For example, the wells may be arranged for a line drive with the injection wells arranged in a line and the production wells in lines parallel to the injection wells or in a pattern such as five spot, inverted five spot, seven spot, inverted seven spot or other conventional arrangements. For simplicity, however, the present invention is described below with reference only to a single injection well and a single production well.

The displacing fluid which is used is one which will displace the reservoir oil under conditions of immiscible or near-immiscible displacement. Carbon dioxide is preferred because it is cheap, readily available and interacts favorably with the oil, not only by the formation of a more mobile solution phase as it dissolves in the oil but also, because it also tends to swell the oil and reduce its viscosity even under conditions which are not conducive to the formation of a solution. Thus, even though a solution is not formed because of unfavorable reservoir conditions, the carbon dioxide penetrates into the oil and forms a more mobile phase which can then be displaced by the displacing fluid and any water slugs.

The displacement which is carried out in the present process proceeds under immiscible conditions or conditions approximating to immiscibility. These conditions will generally prevail at reservoir pressures below the minimum miscibility pressure (MMP) for the selected displacing fluid and the particular reservoir oil. Thus, the present process finds particular applicability in heavy oil reservoirs in which MMP is usually high or in reservoirs which are at relatively low pressures, for example, reservoirs near the surface or reservoirs which cannot be pressured up to a value near the MMP.

The addition of a light hydrocarbon, preferably ethane, to the carbon dioxide displacing fluid has the effect of promoting a greater viscosity reduction than if the carbon dioxide is used by itself. This promotes the formation of a more mobile phase which can be more readily displaced from the formation, with improved recovery and recovery efficiency (oil recovered in proportion to displacing fluid). This effect appears to arise from the increased solubility of the carbon dioxide in the oil in the presence of the ethane, this resulting in increased swelling of the oil and the reduction in its viscosity. Although ethane is the preferred hydrocarbon to be used with carbon dioxide as the displacing fluid, other light hydrocarbons such as LPG and $C_3$ to $C_6$ alkanes such as propane and butane may also be used. The effect of the hydrocarbon additive on increasing the solubility of the carbon dioxide may be observed over a range of additive concentrations but it has been noted that under total reservoir pressures of not more than 2000 psia (13790 kPa), the increase in solubility in proportionately greater at additive concentrations below 25 mole percent, this increase becoming proportionately less at higher additive concentrations. By contrast, at higher reservoir pressures, e.g. above 2000 psia (13790 kPa), the increase in solubility is essentially linear with additive concentration. Thus, in low pressure reservoirs where the total reservoir pressure is below 2000 psia (13790 kPa), e.g. 1500 psia (10342 kPa), it is preferred to operate with not more than 25 mol percent, e.g. 5–20 mol percent, of the hydrocarbon additive in order to secure the greatest proportionate increase in $CO_2$ solubility. This limitation may also be observed at higher reservoir pressures, although more for economic factors (see FIG. 2). However, if the carbon dioxide is injected with a decreasing concentration of the additive as the operation proceeds, as described below, higher initial concentrations of the additive may be used.

Because the reduction in viscosity by dissolution of the displacing fluid in the oil is proportionately greater with heavy oils, e.g. oils having viscosities of 10–10,000 cP at prevailing reservoir temperatures, the present method will be of particular utility in the recovery of these oils although it may also be used with relatively lighter oils, e.g. viscosity of 1–2 cP, although here the reduction is not so marked. Although some dissolution of the displacing fluid occurs, its limited solubility under the conditions prevailing in the reservoir ensures that the displacement takes place under immiscible conditions.

The carbon dioxide is initially injected into the formation with a predetermined amount of the hydrocarbon present in the initial portion in an amount which is sufficient to increase the solubility of the carbon dioxide in the oil so as to achieve the desired swelling and viscosity reduction as the bank of fluid begins to permeate the reservoir. Because, as explained below, the hydrocarbon tends to remain with the crude oil in the formation as the displacement front advances, it may be desirable to include additional amounts of the hydrocarbon additive in the initial portion of the solvent in excess of the amount necessary to reduce the viscosity to the desired degree. The amounts of the preferred light hydrocarbon displacing fluid used with carbon dioxide as the displacing fluid are typically from 2 to 50 molar percent, preferably 5 to 25 molar percent, in the initial portion of the carbon dioxide, decreasing to zero in the final portion of the carbon dioxide. The amount of carbon dioxide will generally be in the range of 0.2 to 0.8 hydrocarbon pore volume (HCPV) with an optimal range of 0.3 to 0.5 HCPV, depending upon reservoir and crude characteristics and other factors. For any reservoir, the optimum amount may be determined by suitable experiment or simulation.

The hydrocarbon additive is soluble in the reservoir oil and therefore remains in the oil which is not displaced by the carbon dioxide as it moves through the reservoir. For this reason, it is possible to reduce the amount of the hydrocarbon additive which is injected with the carbon dioxide as the flooding operation proceeds. If the injected fluid, at any point in the reservoir, contains a proportion of the hydrocarbon additive which is below the equilibrium amount and the residual oil contains an excess of the additive, the additive will either vaporize or be extracted from the residual oil, thus restoring an equilibrium condition to the $CO_2$/additive/crude oil system at that point. This vaporization restores the concentration of additives required in the injected fluid. Thus, the same desired $CO_2$ solubility will be achieved in the reservoir oil. This, in turn, reduces the viscosity of the reservoir oil from the value which would obtain if the additive were not present. Thus, as the amount of the additive in the displacing fluid is reduced and the fluid bank advances through the reservoir, a continuous equilibrium is set up by which the additive is progressively extracted from the residual oil by the advancing carbon dioxide and used to lower the viscosity of the oil, giving a continuous improvement in the displacing effect without the necessity for continuously injecting the additive. In this way, the amount of the additive which is required is reduced and, because it is continuously extracted from the reservoir as more of the displacing fluid is injected, its recovery is improved, making the process more economically attractive from two points of view. Furthermore, the residual oil saturation will be lowered because of the improved efficiency of the flooding operation, as compared to an operation which did not employ the additive. The final amounts of displacing fluid which are injected may be pure fluid, e.g. pure $CO_2$, both because a relatively smaller amount of the additive is required when most of the residual oil has been displaced and because it is desirable to extract as much as possible of the additive from the residual oil remaining in the formation. The reduction in the amount of the additive may be carried out continuously or step-wise although, for practical reasons, step-wise reduction will normally be employed.

As well as bringing about an improvement in the recovery by a reduction in the residual oil saturation, the use of the solubility additive also tends to improve the macroscopic sweep efficiency of the operation by reducing the gravity override of the displacing fluid. Gravity override is the term used to describe the tendency of a displacing fluid to rise towards the top of a reservoir over the denser crude oil and water which are in place in the reservoir. By decreasing the size of the contact zone and the amount of oil contacted by the displacing fluid, it tends to reduce the oil recovery. One method of suppressing the override tendency is to inject at the maximum rate allowed by field constraints so that the resulting higher flow velocities in the horizontal direction balance the upward gravitational forces. (Reducing the well spacing also helps to suppress override but the economics become less favorable because of the reduced recovery at each production well.) The use of the hydrocarbon additive, especially ethane, is particularly advantageous in this respect, that it increases the swelling of the oil by the solvent and facilitates the production of a lower viscosity phase which permits higher injection rates to be employed.

A further improvement in the efficiency of the process may be achieved by injecting the mixture of displacing fluid and additive, if present, in slugs with slugs of water being injected between the solvent slugs in order to improve the sweep of the solvent. In this respect, the process will be a WAG (Water Alternating Gas) process in which slugs of water injected alternatively with slugs of carbon dioxide into the formation will improve the gas invasion and effect of the carbon dioxide. The carbon dioxide slugs will generally be equal in volume, alternating with water slugs of an equal volume, followed by a final water drive. Each carbon dioxide slug should be large enough to ensure the desired decrease in viscosity and given the economic constraints on total carbon dioxide usage, this will generally imply that not more than about four solvent slugs will be employed. At an optimal total $CO_2$ usage of 0.4 HCPV this will require four slugs of 0.1 HCPV each, separated by water slugs of 0.1 HCPV. However, the water:$CO_2$ (WAG) ratio may vary up to 4:1 although the higher WAG ratios above 2:1 may result in insufficient $CO_2$ to form the low viscosity zone ahead of the water front and reduce the recovery. In a multiple $CO_2$ slug operation, the proportion of the ethane may be incrementally reduced with each carbon dioxide slug or may be held at a constant value in the initial slugs at reduced to zero in the final slug, e.g. in a four-slug operation, it may be used in proportions of 10%, 10%, 10% and 0%, with a $CO_2$ slug size of 0.1 HCPV (total $CO_2$ 0.4 HCPV), and a water slug size of 0.1 HCPV (water slug total 0.3 HCPV with water drive following final $CO_2$ slug).

The invention is illustrated by the following Example in which all percentages are by weight unless the contrary is stated.

EXAMPLE

The effect of ethane upon the solubility of carbon dioxide in a 19° API crude oil was investigated by measuring the equilibrium constant, K, for the $CO_2$/oil system at various pressures and concentrations of ethane. The equilibrium constant, K, is defined by:

K = weight fraction $CO_2$ in gas phase/weight fraction $CO_2$ in liquid phase

Figure 2:
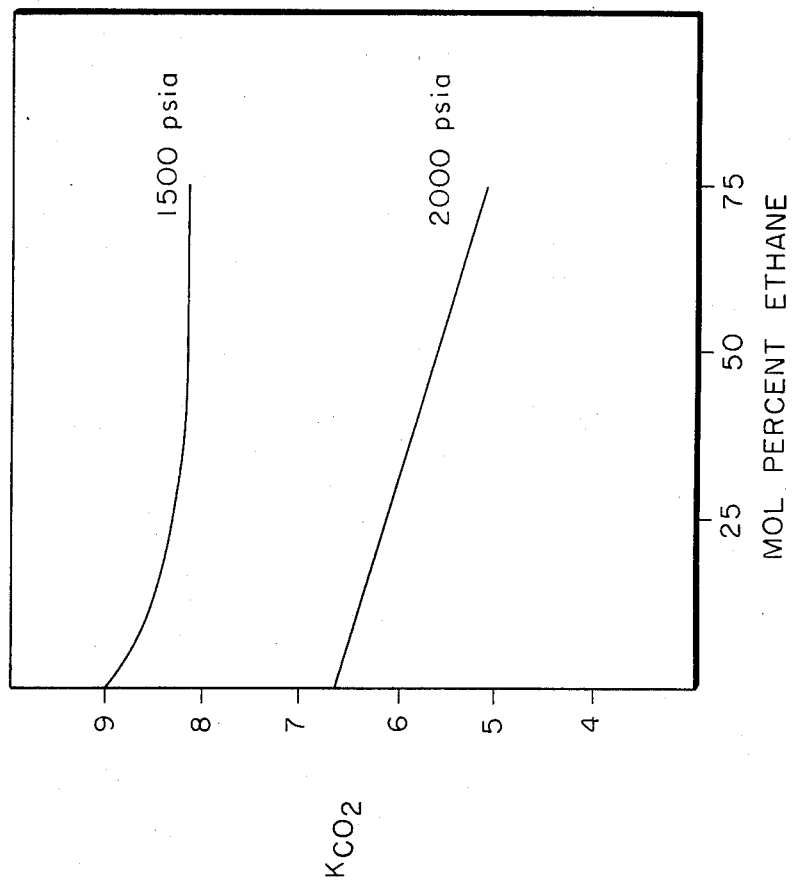
FIG. 2 is a graph relating the solubility of carbon dioxide in oil to the concentration of ethane at varying pressures.

The results are given in FIG. 1, which shows that as the proportion of ethane is increased, the solubility of the carbon dioxide in the oil increases (i.e., K decreases). FIG. 2 shows how the equilibrium constant, K, decreases with increasing ethane concentration at various total pressures.

Figure 3:
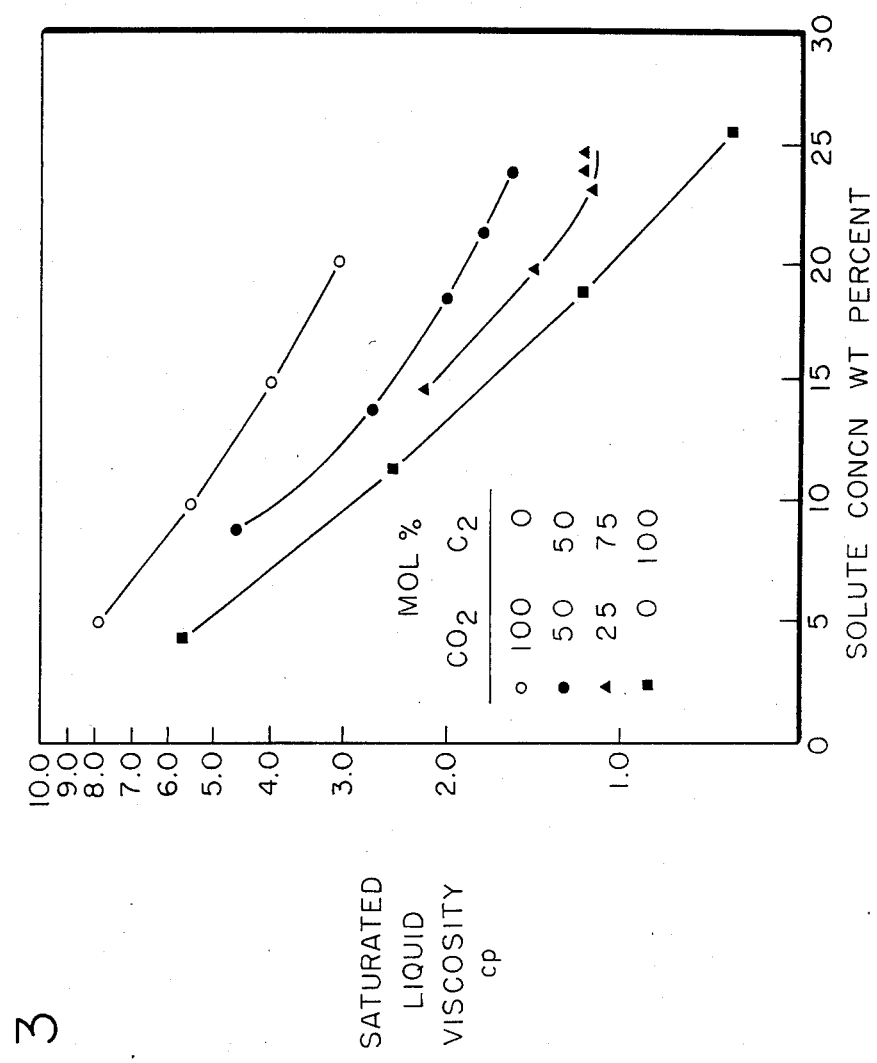
FIG. 3 is a graph relating the viscosity of an oil solution to the solute ($CO_2$/ethane) concentration at varying $CO_2$:ethane ratios.

The effect of the ethane on the viscosity of the oil was investigated by measuring the viscosity of the $CO_2$-saturated oil at various concentrations of ethane in $CO_2$ and of the $CO_2$/ethane solute in the oil. The results are given in FIG. 3.

Figure 4:
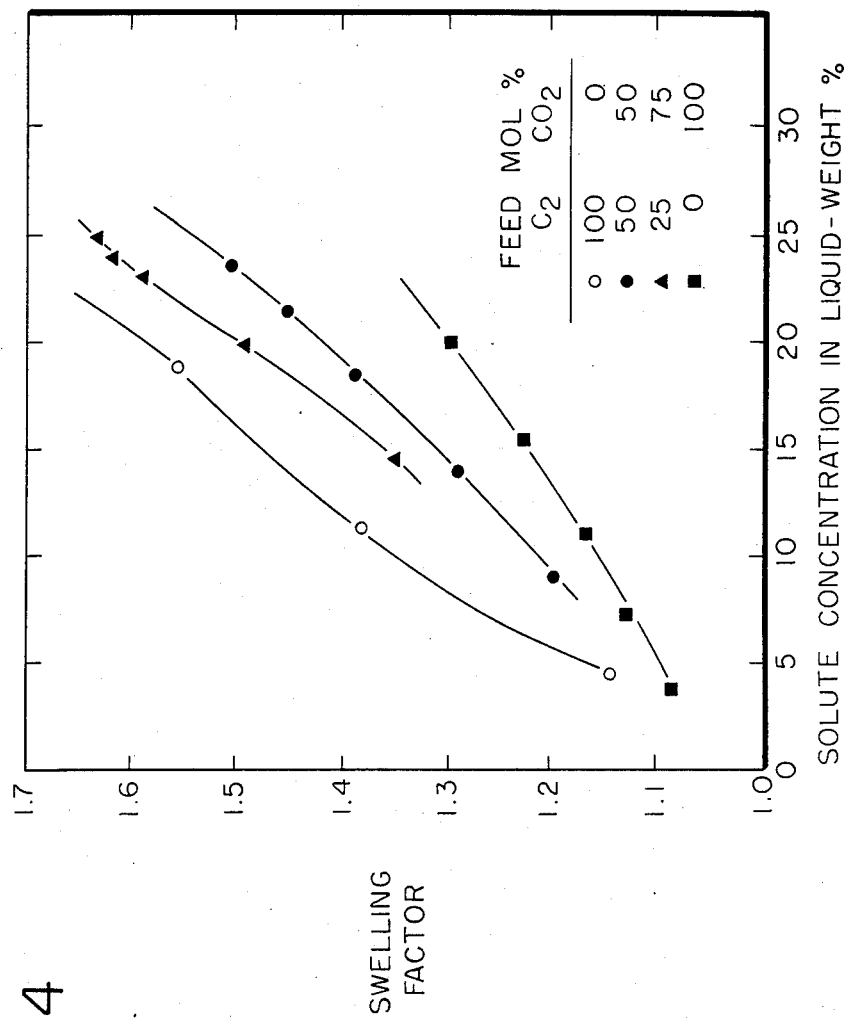
FIG. 4 is a graph relating the swelling factor of an oil to the solute ($CO_2$/ethane) concentration at varying $CO_2$:ethane ratios.

The swelling factor was also determined at different solute ($CO_2$/ethane) concentration in the crude oil. The swelling factor is the ratio of the volumes of the oil with and without dissolved solute ($CO_2$, ethane) under standard conditions of temperature and pressure. The results are given in FIG. 4, showing that the use of ethane promotes an increase in the swelling of the oil leading to a reduction in viscosity, favoring a displacement under immiscible conditions, with a maximum increase in the swelling factor obtained at an ethane:$CO_2$ ratio of 25:75 (by weight), indicating the favorability of $CO_2$:ethane ratios of this order.

I claim:

1. A method for the recovery of oil from a subterranean, oil-bearing reservoir penetrated by an injection well and a production well extending from the surface of the earth into the reservoir, which method comprises:
   (i) injecting into the reservoir through the injection well, a mixture of an oil-displacing fluid, which is essentially immiscible with the oil under the conditions prevailing in the reservoir, and up to 25 mole percent of a hydrocarbon additive thereby forming a mobile phase which substantially increases the limited solubility of the displacing fluid in the reservoir oil to reduce the viscosity of the reservoir oil; and
   (ii) producing fluids including oil from the production well.

2. A method according to claim 1 in which the displacing fluid comprises carbon dioxide.

3. A method according to claim 2 in which the hydrocarbon additive comprises ethane.

4. A method according to claim 3 in which the proportion of ethane in the carbon dioxide displacing fluid is decreased as oil is displaced from the reservoir and produced at the production well.

5. A method according to claim 4 in which the displacing fluid is injected in a plurality of slugs separated by at least one slug of water, the last slug of carbon dioxide displacing fluid being followed by a water drive.

6. A method according to claim 5 in which the final slug of carbon dioxide displacing fluid is free of ethane.

7. A method according to claim 1 in which the reservoir pressure is below 2000 psia.

8. A method according to claim 1 in which the viscosity of the oil is from 10 to 10,000 cp at the temperature of the reservoir.

9. A method for the recovery of oil from a subterranean, oil-bearing reservoir penetrated by an injection well and a production well extending from the surface of the earth into the reservoir, which method comprises:
   (i) injecting into the reservoir through the injection well, a mixture of an oil-displacing fluid, which is essentially immiscible with the oil under the conditions prevailing in the reservoir, and a hydrocarbon additive thereby forming a mobile phase, in which said additive is in an amount sufficient to substantially increase the limited solubility of the displacing fluid in the reservoir oil to reduce the viscosity of the reservoir oil;
   (ii) producing fluids including oil from the production well; and
   (iii) continuing to inject the mixture of displacing fluid and additive into the reservoir with a reduced proportion of the additive in the mixture relative to the initially injected mixture.

10. A method according to claim 9 in which the amount of additive in the mixture is reduced to zero in the finally injected portion of the mixture.

11. A method according to claim 9 in which the concentration of the additive in the mixture is reduced step-wise as the mixture is injected.

12. A method according to claim 9 in which the mixture is injected in slugs into the reservoir.

13. A method according to claim 12 in which slugs of water are injected into the reservoir through the injection well between the slugs of the mixture.

14. A method according to claim 13 in which the concentration of the additive in the final slug of the mixture is zero.

15. A method according to claim 9 in which the displacing fluid is carbon dioxide.

16. A method according to claim 15 in which the hydrocarbon additive comprises a low molecular weight hydrocarbon.

17. A method according to claim 16 in which the hydrocarbon additive comprises ethane.

18. A method according to claim 9 in which water is injected into the reservoir through the injection well following the final injection of the mixture.

19. A method for the recovery of oil from a subterranean, oil-bearing reservoir penetrated by an injection well and a production well extending from the surface of the earth into the reservoir, which method comprises:
(i) injecting into the reservoir through the injection well a slug of a mixture of carbon dioxide and ethane, which ethane is in an amount sufficient to substantially increase the limited solubility of said mixture and displace the oil from the reservoir under immiscible conditions;
(ii) injecting a slug of water after the slug of the mixture;
(iii) injecting a slug of carbon dioxide into the reservoir through the injection well; and
(iv) producing fluids including oil from the production well.

20. A method according to claim 19 in which a plurality of slugs of the mixture are injected in the reservoir through the injection well in step (i).

21. A method according to claim 20 in which a slug of water is injected into the formation between each two slugs containing the carbon dioxide in step (i).

22. A method according to claim 21 in which water is injected into the reservoir after the final carbon dioxide slug.

23. A method according to claim 19 in which the final carbon dioxide-containing slug comprises pure carbon dioxide.

24. A method according to claim 19 in which the hydrocarbon additive comprises ethane.

25. A method according to claim 19 in which pure carbon dioxide is injected into the reservoir through the injection well when the residual oil becomes saturated with the solubility improving additive.

26. A method to improve the sweep efficiency and minimize gravity override during the recovery of oil from a subterranean, oil-bearing reservoir penetrated by an injection well and a production well extending from the surface of the earth into the reservoir, which comprises:
(i) injecting into the reservoir through the injection well, a mixture of an oil-displacing fluid, which is essentially immiscible with the oil under the conditions prevailing in the reservoir, and up to 25 mole percent of a hydrocarbon additive thereby forming a mobile phase which substantially increases the limited solubility of the displacing fluid in the reservoir oil to reduce the viscosity of the reservoir oil; and
(ii) producing fluids including oil from the prduction well.

27. The method according to claim 26 in which the displacing fluid comprises carbon dioxide.

28. The method according to claim 27 in which the hydrocarbon additive comprises ethane.

29. The method according to claim 26 in which the reservoir pressure is below 2000 psia.

30. The method according to claim 26 in which the viscosity of the oil is from 10 to 10,000 cp at the temperature of the reservoir.

31. The method according to claim 30 in which the proportion of ethane in the carbon dioxide displacing fluid is decreased as oil is displaced from the reservoir and produced at the production well.

32. The method according to claim 31 in which the displacing fluid is injected in a plurality of slugs separated by at least one slug of water, the last slug of carbon dioxide displacing fluid being followed by a water drive.

33. The method according to claim 32 in which the final slug of carbon dioxide displacing fluid is free of ethane.

* * * * *